United States Patent
Hirshberg et al.

(10) Patent No.: US 10,824,469 B2
(45) Date of Patent: Nov. 3, 2020

(54) REORDERING AVOIDANCE FOR FLOWS DURING TRANSITION BETWEEN SLOW-PATH HANDLING AND FAST-PATH HANDLING

(71) Applicant: Mellanox Technologies, Ltd., Yokneam (IL)

(72) Inventors: Eitan Hirshberg, Pardes Hana-Karkur (IL); Ariel Shahar, Jerusalem (IL); Najeeb Darawshy, Iksal (IL); Omri Kahalon, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 51 days.

(21) Appl. No.: 16/202,132

(22) Filed: Nov. 28, 2018

(65) Prior Publication Data
US 2020/0167192 A1    May 28, 2020

(51) Int. Cl.
*G06F 9/48*      (2006.01)
*G06F 9/38*      (2018.01)
*G06F 9/30*      (2018.01)

(52) U.S. Cl.
CPC .......... *G06F 9/4887* (2013.01); *G06F 9/3005* (2013.01); *G06F 9/3851* (2013.01); *G06F 9/3855* (2013.01); *G06F 9/3857* (2013.01)

(58) Field of Classification Search
CPC .... G06F 9/3005; G06F 9/3851; G06F 9/3855; G06F 9/3857; G06F 9/4887
USPC ....................................................... 718/102
See application file for complete search history.

(56) References Cited

U.S. PATENT DOCUMENTS

| | | |
|---|---|---|
| 6,901,496 B1 | 5/2005 | Mukund et al. |
| 7,657,659 B1 | 2/2010 | Lambeth et al. |
| 8,006,297 B2 | 8/2011 | Johnson et al. |
| 8,103,785 B2 | 1/2012 | Crowley et al. |
| 8,824,492 B2 | 9/2014 | Wang et al. |
| 9,038,073 B2 * | 5/2015 | Kohlenz ............... G06F 9/5044 718/100 |
| 9,678,818 B2 | 6/2017 | Raikin et al. |

(Continued)

FOREIGN PATENT DOCUMENTS

| | | |
|---|---|---|
| EP | 1657878 A1 | 5/2006 |
| EP | 2463782 A2 | 6/2012 |
| WO | 2010062679 | 6/2010 |

OTHER PUBLICATIONS

U.S. Appl. No. 16/012,826 office action dated Oct. 1, 2019.

(Continued)

*Primary Examiner* — Andrew M. Lyons
(74) *Attorney, Agent, or Firm* — Kligler & Associates Patent Attorneys Ltd

(57) ABSTRACT

A computer system includes one or more processors, one or more hardware accelerators, and control circuitry. The processors are configured to run software that executes tasks in a normal mode. The accelerators are configured to execute the tasks in an accelerated mode. The control circuitry is configured to receive one or more flows of tasks for execution by the processors and the accelerators, assign one or more initial tasks of each flow for execution by the processors, assign subsequent tasks of each flow for execution by the accelerators, and verify, for each flow, that the accelerators do not execute the subsequent tasks of the flow until the processors have fully executed the initial tasks of the flow.

8 Claims, 5 Drawing Sheets

OOO Avoidance Mode Off

OOO Avoidance Mode On

(56) References Cited

U.S. PATENT DOCUMENTS

| | | | |
|---|---|---|---|
| 9,904,568 | B2 | 2/2018 | Vincent et al. |
| 10,078,613 | B1 | 9/2018 | Ramey |
| 10,120,832 | B2 | 11/2018 | Raindel et al. |
| 10,152,441 | B2 | 12/2018 | Liss et al. |
| 10,210,125 | B2 | 2/2019 | Burstein |
| 10,218,645 | B2 | 2/2019 | Raindel et al. |
| 10,423,774 | B1 | 4/2019 | Zelenov et al. |
| 10,382,350 | B2 | 8/2019 | Bohrer et al. |
| 10,599,441 | B2 * | 3/2020 | Basher .................. G06F 9/46 |
| 2003/0023846 | A1 | 1/2003 | Krishna et al. |
| 2004/0039940 | A1 * | 2/2004 | Cox .................. H04L 29/06 709/224 |
| 2004/0057434 | A1 | 3/2004 | Poon et al. |
| 2004/0158710 | A1 | 8/2004 | Buer et al. |
| 2005/0102497 | A1 | 5/2005 | Buer |
| 2005/0198412 | A1 | 9/2005 | Pedersen et al. |
| 2006/0095754 | A1 | 5/2006 | Hyder et al. |
| 2006/0104308 | A1 | 5/2006 | Pinkerton et al. |
| 2009/0086736 | A1 | 4/2009 | Foong et al. |
| 2009/0106771 | A1 | 4/2009 | Benner et al. |
| 2009/0319775 | A1 | 12/2009 | Buer et al. |
| 2009/0328170 | A1 | 12/2009 | Williams et al. |
| 2010/0228962 | A1 | 9/2010 | Simon et al. |
| 2012/0314709 | A1 | 12/2012 | Post et al. |
| 2013/0080651 | A1 | 3/2013 | Pope et al. |
| 2013/0125125 | A1 | 5/2013 | Karin et al. |
| 2013/0142205 | A1 | 6/2013 | Munoz |
| 2013/0263247 | A1 | 10/2013 | Jungck et al. |
| 2013/0276133 | A1 | 10/2013 | Hodges et al. |
| 2013/0329557 | A1 | 12/2013 | Petry |
| 2013/0347110 | A1 | 12/2013 | Dalal |
| 2014/0129741 | A1 | 5/2014 | Shahar et al. |
| 2014/0185616 | A1 | 7/2014 | Bloch et al. |
| 2014/0254593 | A1 | 9/2014 | Mital et al. |
| 2014/0282050 | A1 | 9/2014 | Quinn et al. |
| 2014/0282561 | A1 * | 9/2014 | Holt .................. G06F 9/4881 718/102 |
| 2015/0100962 | A1 | 4/2015 | Morita et al. |
| 2015/0288624 | A1 | 10/2015 | Raindel et al. |
| 2015/0347185 | A1 * | 12/2015 | Holt .................. H04L 49/00 718/102 |
| 2015/0355938 | A1 * | 12/2015 | Jokinen .................. G06F 9/4881 718/107 |
| 2016/0132329 | A1 * | 5/2016 | Gupte .................. G06F 9/4887 718/103 |
| 2016/0226822 | A1 | 8/2016 | Zhang et al. |
| 2016/0330112 | A1 | 11/2016 | Raindel et al. |
| 2016/0330301 | A1 | 11/2016 | Raindel et al. |
| 2016/0342547 | A1 | 11/2016 | Liss et al. |
| 2016/0350151 | A1 | 12/2016 | Zou et al. |
| 2016/0378529 | A1 | 12/2016 | Wen |
| 2017/0075855 | A1 | 3/2017 | Sajeepa et al. |
| 2017/0180273 | A1 | 6/2017 | Daly et al. |
| 2017/0237672 | A1 | 8/2017 | Dalal |
| 2017/0264622 | A1 | 9/2017 | Cooper et al. |
| 2017/0286157 | A1 | 10/2017 | Hasting et al. |
| 2018/0004954 | A1 | 1/2018 | Liguori et al. |
| 2018/0067893 | A1 | 3/2018 | Raindel et al. |
| 2018/0109471 | A1 | 4/2018 | Chang et al. |
| 2018/0114013 | A1 * | 4/2018 | Sood .................. G06F 9/45558 |
| 2018/0210751 | A1 | 7/2018 | Pepus et al. |
| 2018/0219770 | A1 | 8/2018 | Wu et al. |
| 2018/0219772 | A1 | 8/2018 | Koster et al. |
| 2018/0246768 | A1 * | 8/2018 | Palermo .................. H04L 67/12 |
| 2018/0262468 | A1 | 9/2018 | Kumar et al. |
| 2018/0285288 | A1 | 10/2018 | Bernat et al. |
| 2018/0329828 | A1 | 11/2018 | Apfelbaum et al. |
| 2019/0012350 | A1 | 1/2019 | Sindhu et al. |
| 2019/0026157 | A1 * | 1/2019 | Suzuki .................. G06F 9/3877 |
| 2019/0073217 | A1 * | 3/2019 | Basher .................. G06F 9/3004 |
| 2019/0116127 | A1 | 4/2019 | Pismenny et al. |
| 2019/0163364 | A1 | 5/2019 | Gibb et al. |
| 2019/0173846 | A1 | 6/2019 | Patterson et al. |
| 2019/0250938 | A1 | 8/2019 | Claes et al. |
| 2020/0012604 | A1 | 1/2020 | Agarwal |
| 2020/0026656 | A1 | 1/2020 | Liao et al. |

OTHER PUBLICATIONS

International Application No. PCT/IB2018/058705 search report dated Feb. 18, 2019.

International Application No. PCT/IB2018/059824 search report dated Mar. 22, 2019.

Shirey., "Internet Security Glossary, Version 2", Request for Comments 4949, pp. 1-365, Aug. 2007.

Information Sciences Institute, "Transmission Control Protocol; DARPA Internet Program Protocol Specification", Request for Comments 793, pp. 1-90, Sep. 1981.

InfiniBand TM Architecture Specification vol. 1, Release 1.3, pp. 1-1842, Mar. 3, 2015.

Stevens., "TCP Slow Start, Congestion Avoidance, Fast Retransmit, and Fast Recovery Algorithms", Request for Comments 2001, pp. 1-6, Jan. 1997.

Metronome Systems, Inc., "Open vSwitch Offload and Acceleration with Agilio® CX SmartNICs", White Paper, pp. 1-7, Mar. 2017.

PCI Express® Base Specification, Revision 3.0, pp. 1-860, Nov. 10, 2010.

Bohrer et al., U.S. Appl. No. 15/701,459, filed Sep. 12, 2017.

Menachem et al., U.S. Appl. No. 15/841,339, filed Dec. 14, 2017.

Levi et al., U.S. Appl. No. 16/012,826, filed Jun. 20, 2018.

Pismenny et at ., U.S. Appl. No. 16/159,767, filed Oct. 15, 2018.

Comer., "Packet Classification: A Faster, More General Alternative to Demultiplexing", The Internet Protocol Journal, vol. 15, No. 4, pp. 12-22, Dec. 2012.

U.S. Appl. No. 15/701,459 office action dated Dec. 27, 2018.

Dierks et al., "The Transport Layer Security (TLS) Protocol Version 1.2", Request for Comments: 5246 , pp. 1-104, Aug. 2008.

Turner et al., "Prohibiting Secure Sockets Layer (SSL) Version 2.0", Request for Comments: 6176, pp. 1-4, Mar. 2011.

Rescorla et al., "The Transport Layer Security (TLS) Protocol Version 1.3", Request for Comments: 8446, pp. 1-160, Aug. 2018.

Salowey et al., "AES Galois Counter Mode (GCM) Cipher Suites for TLS", Request for Comments: 5288, pp. 1-8, Aug. 2008.

U.S. Appl. No. 15/146,013 Office Action dated Dec 19, 2018.

European Application No. 201668019 search report dated May 29, 2020.

Burstein, "Enabling Remote Persistent Memory", SNIA- PM Summit, pp. 1-24, Jan. 24, 2019.

Chung et al., "Serving DNNs in Real Time at Datacenter Scale with Project Brainwave", IEEE MICRO PRE-PRINT, pp. 1-11, Mar. 22, 2018.

Talpey, "Remote Persistent Memory—With Nothing But Net", SNIA—Storage developer conference , pp. 1-30, year 2017.

Microsoft, "Project Brainwave", pp. 1-5, year 2019.

* cited by examiner

REORDERING AVOIDANCE FOR FLOWS DURING TRANSITION BETWEEN SLOW-PATH HANDLING AND FAST-PATH HANDLING

FIELD OF THE INVENTION

The present invention relates generally to multitasking computer systems, and particularly to computer and communication systems with concurrent packet processing.

BACKGROUND OF THE INVENTION

In computers and in communication systems, accelerators are sometimes used to accelerate the execution of tasks. Typically, tasks can be executed by software (which will be referred to hereinafter interchangeably as Slow Mode or Normal Mode) or by the accelerator (which will be referred to hereinafter as Accelerated Mode). For example, in a communication processor, packet classification for some of the packets may be done by software, while other packets may be classified by a hardware accelerator.

References to hardware-based packet classification can be found, for example, by Comer, in "Packet Classification: A Faster, More Generic Alternative to Demultiplexing," The Internet Protocol Journal, Volume 15, No. 4, December. 2012.

SUMMARY OF THE INVENTION

An embodiment of the present invention that is described herein provides a computer system including one or more processors, one or more hardware accelerators, and control circuitry. The processors are configured to run software that executes tasks in a normal mode. The hardware accelerators are configured to execute the tasks in an accelerated mode. The control circuitry is configured to receive one or more flows of tasks for execution by the processors and the accelerators, assign one or more initial tasks of each flow for execution by the processors, assign subsequent tasks of each flow for execution by the accelerators, and verify, for each flow, that the accelerators do not execute the subsequent tasks of the flow until the processors have fully executed the initial tasks of the flow.

In an embodiment, the control circuitry is further configured to assign ID codes to the tasks, and to verify, for each flow, that the accelerators do not execute the subsequent tasks until the processors have fully executed the initial tasks, by comparing a most-recently assigned task ID to the IDs of one or more of the tasks executed in the Normal Mode.

In another embodiment, the tasks include packet headers classification tasks.

In yet another embodiment, the processors are configured to generate and send to the accelerators a rule upon executing the initial tasks of a given flow, and the accelerators are configured to execute the subsequent tasks of the given flow in accordance with the rule.

There is additionally provided, in accordance with an embodiment of the present invention, a method in a computer system having one or more processors that execute tasks in normal mode, one or more hardware accelerators that execute tasks in accelerated mode, and control circuitry. One or more flows of the tasks are received for execution by the processors and the accelerators. One or more initial tasks of each flow are assigned for execution by the processors, and subsequent tasks of each flow are assigned for execution by the accelerators. A verification is made, for each flow, that the accelerators do not execute the subsequent tasks of the flow until the processors have fully executed the initial tasks of the flow.

The present invention will be more fully understood from the following detailed description of the embodiments thereof, taken together with the drawings in which:

DETAILED DESCRIPTION OF EMBODIMENTS

Overview

Figure 1:
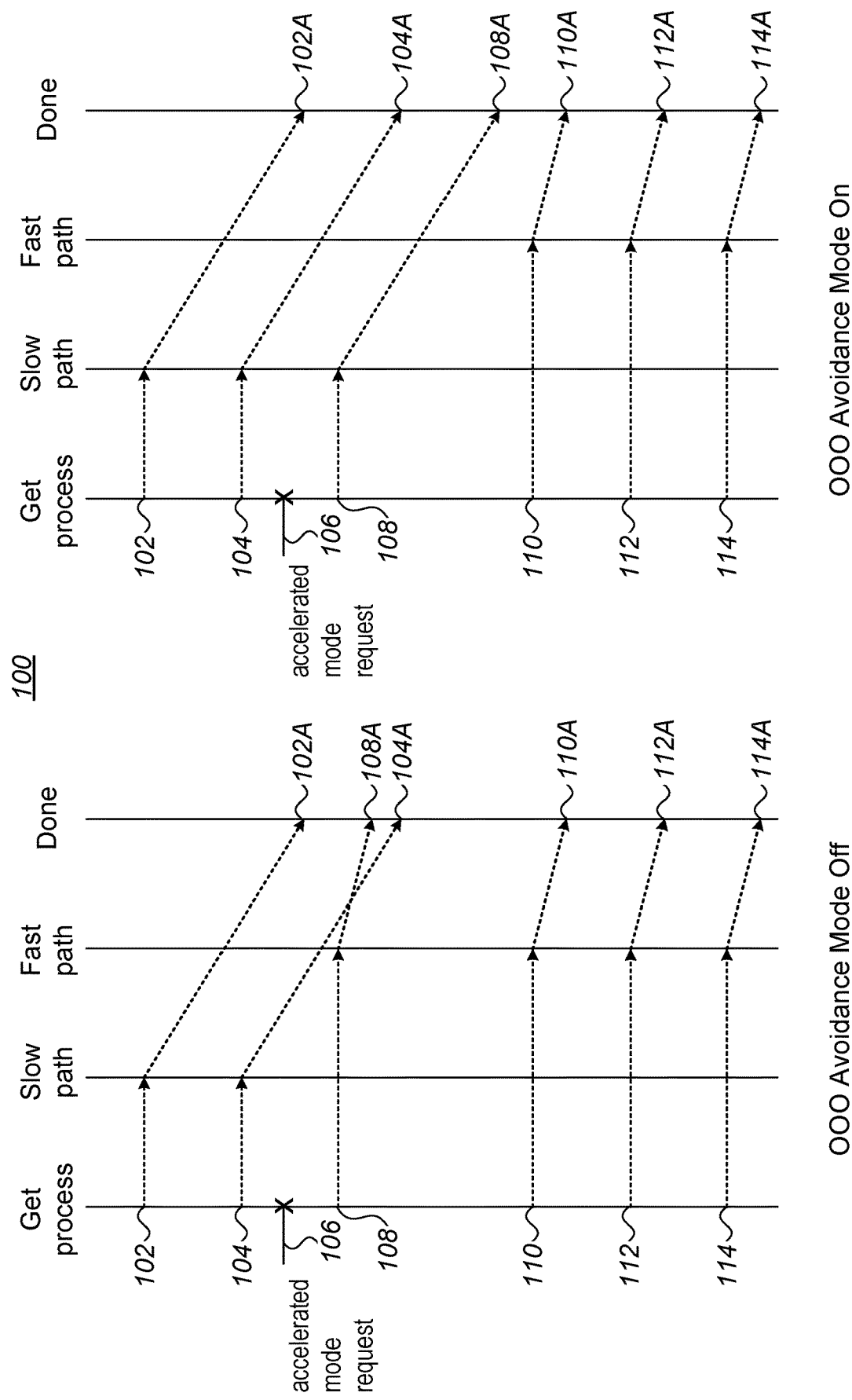
FIG. 1 is a timing chart that schematically illustrates the timing of the execution of tasks by a computer system, in accordance with an embodiment of the present invention.

A computer system in accordance with embodiments of the present invention may comprise one or more Central Processing units (CPUs), one or more hardware accelerators, one or more Accelerated Mode indicators and one or more Control Units. According to embodiments of the present invention, the system may execute one or more programs concurrently, wherein each program comprises tasks that are typically executed in a serial manner. For example, in a communication system, packets which are associated with the same source address are typically processed serially (and will be referred to hereinafter as Flows), but several flows can be processed concurrently.

according to some embodiments, for each flow, a hardware accelerator may be used to accelerate the execution of tasks, and each task may be executed by the CPUs (i.e. in Slow Mode) or offloaded to the accelerators (i.e. executed in Accelerated Mode). The Slow mode is also referred to herein as a Normal mode, in the sense that it is not accelerated.

In embodiments of the present invention, control software (e.g. a Hypervisor) runs on the CPUs and dispatches for execution tasks that the CPUs receive, either by the CPUs or by the accelerators. In an embodiment, configurable accelerators are used, and the control software must configure the accelerators before they can be used to accelerate the execution of tasks.

In some embodiments, configuring the accelerators comprises sending rules to the accelerators pertaining to the acceleration methods of some or all the tasks. When a flow of tasks starts, acceleration rules may not be known, and, thus, one or more first tasks of a flow will execute in slow mode. After one or more tasks execute in slow mode, the control software may generate a rule and send it to the accelerators, which may then execute further tasks, in accelerated mode, using the rule.

Typically, Slow mode processing of tasks has longer latency than accelerated processing, and, therefore, by the time the control software sends a rule to the accelerator, one or more tasks may be processed in slow mode. If a new task is received before all slow tasks complete, and if the new task is offloaded to be executed by an accelerator, the accelerator may complete its execution prior to the time that a previously received task completes its execution in slow mode. In this case, the slow task and the accelerated task will be processed and output Out of Order. Out of Order will be referred to hereinafter as OoO. Out of order execution may produce erroneous results. For example, in communication systems, if OoO packets are received they may be dropped.

Embodiments of the present invention provide apparatuses and methods wherein OoO is avoided. We will refer to Out-of-Order Avoidance as OoO-A hereinbelow. In accordance with embodiments of the present invention, the computer system comprises a control unit, configured to control whether tasks are executed in slow mode or accelerated mode; the control unit is further configured to avoid OoO execution by forcing slow-mode execution of tasks if any preceding slow-mode task has not completed execution.

In an embodiment, the control unit assigns unique ID numbers to the tasks that the computer system receives. When tasks execution in slow mode is completed, the ID of the completed task is compared with the last (most recent) task ID that the Control Unit has generated. According to embodiments, if the two ID codes are not identical, a new task may be processed in slow mode although a rule for the new task exists, to avoid OoO.

In some embodiments (for example, embodiments related to communication computer systems), tasks comprise packet processing, the accelerators classify packets, and configuring the accelerators comprises sending rules to the classifiers pertaining to the classification methods of some or all the packets. When a flow of packets starts, the rule to accelerate the classification may not be known, and, thus, one or more first packets of a flow may be processed in slow mode (i.e., by software). After one or more packets execute in slow mode, the software generates and sends rules to the classifiers, which may then classify further packets. The classifiers will classify packets only if the last assigned (most-recently assigned) ID is identical to the ID of the last (most recent) packet which was processed in slow mode. Thus, OoO processing of packets is avoided.

System Description

FIG. 1 is a timing chart 100 that schematically illustrates the timing of the execution of tasks by a computer system, in accordance with an embodiment of the present invention. In a computer system according to the example embodiment, OoO-A may be a mode, which can be either Off or On. The left half of FIG. 1 illustrates the timing chart for the case wherein OoO-A mode is Off, indicating that OoO execution is allowed, whereas the right half of FIG. 1 illustrates the timing chart for the case wherein OoO-A mode is On, indicating that OoO execution should be avoided.

The vertical axis in FIG. 1 indicates time, wherein time grows in the down direction. In both the left half and the right half of FIG. 1, the computer system receives the same set of tasks, in the same order and at the same time.

When the computer system is in an OoO-A Off mode, it first receives task 102 and executes it in Slow Mode, completing at the point marked 102A. Next, the computer system receives tasks 104, and, again, executes the task in slow mode, completing at the point marked 104A. After receiving task 104, the computer system receives a request 106 to start accelerated mode execution for the current flow. According to embodiments of the present invention, if the computer system is in OoO-A Off mode, it will, in response to receiving a request to start accelerated mode execution for the current flow, execute all further tasks of the current flow in accelerated mode. Thus, tasks 108, 110, 112 and 114 will be executed in accelerated mode, completing at points 108A, 110A, 112A and 114A, respectively.

As the time required for slow mode execution is longer than the delay from the time the computer system receives task 104 to the time the computer system receives task 108, task 104 will complete (at point 104A) after task 108 completes (point 108A) i.e. tasks 104 and 108 will be executed out-of-order.

When the computer system is in OoO-A On mode (right half of FIG. 1), it executes the first two tasks in the same manner as when OoO-A mode is Off—the computer system first receives task 102 and executes it in Slow Mode, completing at the point marked 102A. Next, the computer system receives tasks 104, and, again, executes the task in slow mode, completing at the point marked 104A. After receiving task 104, the computer system receives a request 106 to start accelerated mode execution for the current flow.

According to embodiments of the present invention, if the computer is in OoO-A On mode it will, in response to receiving a request to start accelerated mode execution, execute further tasks of the current flow in accelerated mode only if the last task ID is identical to the ID of the last task which completed slow-mode execution. When the CPU receives task 108, the last completed slow-mode task is 102, and hence the computer system will execute task 108 in slow mode, finishing at the point marked 108A. Tasks 104 and 108 will thus be executed in the right order, finishing at points 104A and 108A, respectively.

The time required for slow mode execution is shorter than the delay from the time the computer system receives task 108 to the time the computer system receives task 110. Consequently, when the computer system next receives task 110, task 108 is already completed (point 108A is earlier than 110). The computer system will thus execute tasks 110, 112 and 114 in accelerated mode, completing at points 110A, 112A and 114A, respectively.

Thus, according to embodiments of the present invention, if OoO-A mode is On and accelerated mode execution is requested, the computer system will delay accelerated mode to avoid out-of-order execution.

The timing charts that are described in FIG. 1 are example charts, shown purely for the sake of conceptual clarity. The relative timing of the received tasks, the time of the Accelerated-mode request, and the slow-mode latency time are merely examples; other suitable values may be used.

Figure 2:
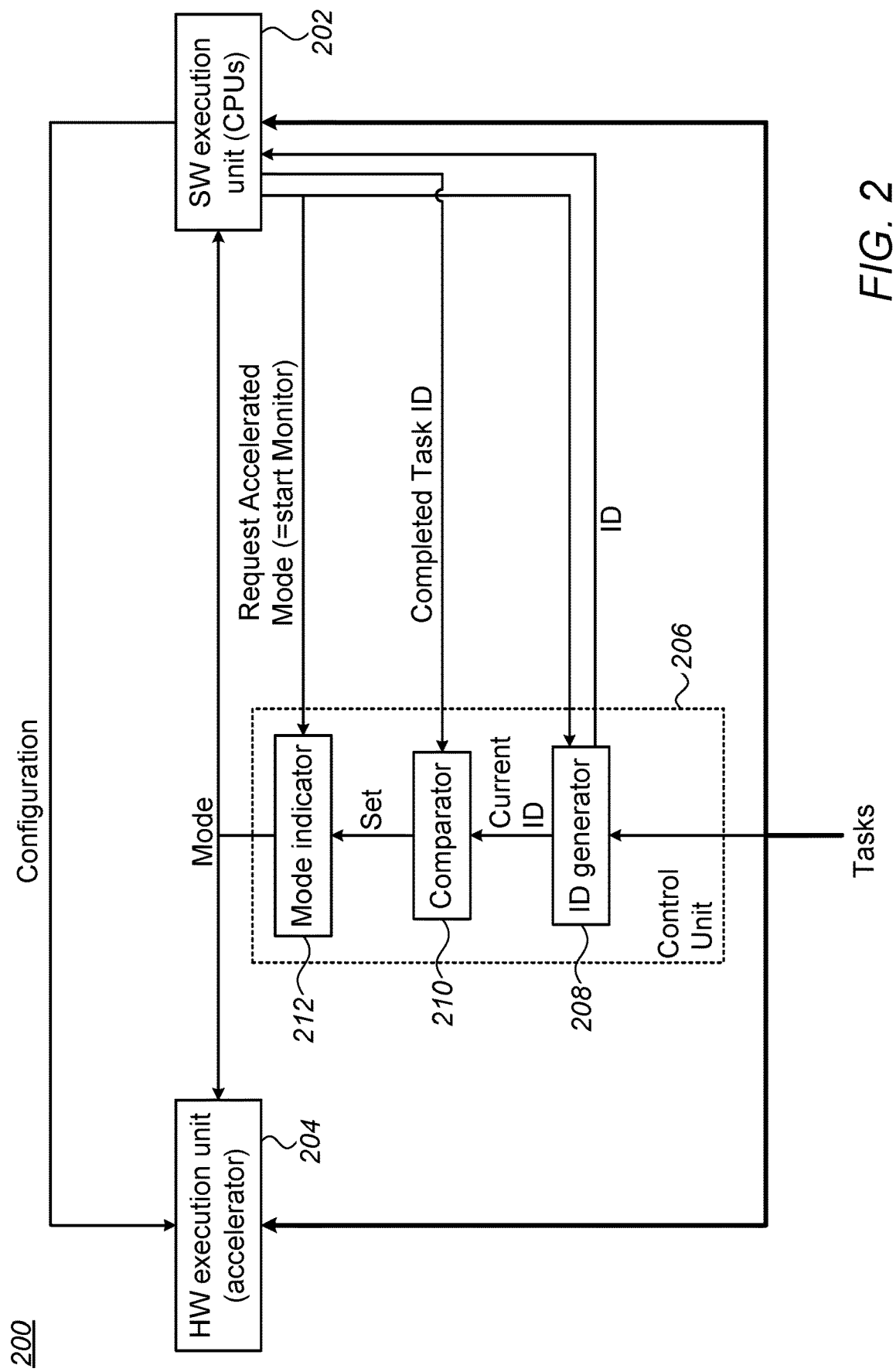
FIG. 2 is a block diagram that schematically illustrates the structure of an out-of-order avoidance computer system, in accordance with an embodiment of the present invention.

FIG. 2 is a block diagram that schematically illustrates the structure of an out-of-order avoidance computer system 200, in accordance with an embodiment of the present invention. The computer system comprises a Software Execution Unit 202, configured to execute tasks in a slow mode, an Accelerator 204, configured to execute tasks in accelerated mode, and a Control Unit 206, configured to monitor flows of tasks, and further comprising an ID Generator 208, which generates ID codes for tasks, a Comparator 210, which compares ID codes, and a Mode Indicator 212, which indicates if the computer system is in Accelerated Mode or Slow mode, for the current flow of tasks (the Control Units will also be referred to as Control Circuitry hereinbelow).

According to some embodiments of the present invention, SW Execution Unit 202 comprises CPUs, and may, after executing one or more tasks of a flow of task, issue a Request Accelerated Mode indication, and send the request indication to Control Unit 206.

According to an embodiment of the present invention, tasks that the computer system receives are input to Accelerator 204, to Software Execution Unit 202, and to ID generation unit 208 of Control Unit 206. Accelerator 204 is configured to execute the tasks if the mode, as indicated by Mode Indicator 212 of Control Unit 206, is Accelerated Execution, whereas SW Execution Unit 202 is configured to execute the tasks if the mode, as indicated by the Mode Indicator, is Slow Execution.

ID Generation unit 208 generates a unique ID (for example, a sequential number) for every task that the computer system receives. The ID Generation Unit sends the ID to SW Execution Unit 202, which then sends the ID of every task that the SW Execution unit completes, to Comparator 210 of Control Unit 206.

Mode Indicator 212 can be in one of two states—Accelerated Mode and Slow Mode. Initially (when the flow of tasks starts), the Mode Indicator is at Slow Mode. According to embodiments of the present invention, mode indicator 212 will change its state to Accelerated Mode if the following two conditions are true: i) Comparator 210 indicates that the last task ID, generated by ID Generation Unit 208, is equal to the ID of the last task that SW Execution Unit 202 completed; and, ii) the Mode Indicator has received an Accelerated Mode Request from SW Execution Unit 202.

According to some embodiments, computer system 200 may have two modes of operation for some or for all the flows—OoO-A On, and OoO-A Off. When in OoO-A off mode, mode indicator 212 will be set to Accelerated Mode when it receives an Accelerated Mode Request from SW Execution Unit 202, irrespective of the output of the comparator; according to embodiments, in this case OoO execution may take place.

In embodiments of the present invention, Control Unit 206 may be replicated more than once, to allow concurrent processing of a plurality of flows of tasks.

Thus, according to the example embodiment of FIG. 2, when OoO-A mode is on, mode indicator 212 will set to Accelerated Mode when the next task that the computer system receives does not precede the completion of any previous task, avoiding out-of-order execution.

Figure 3:
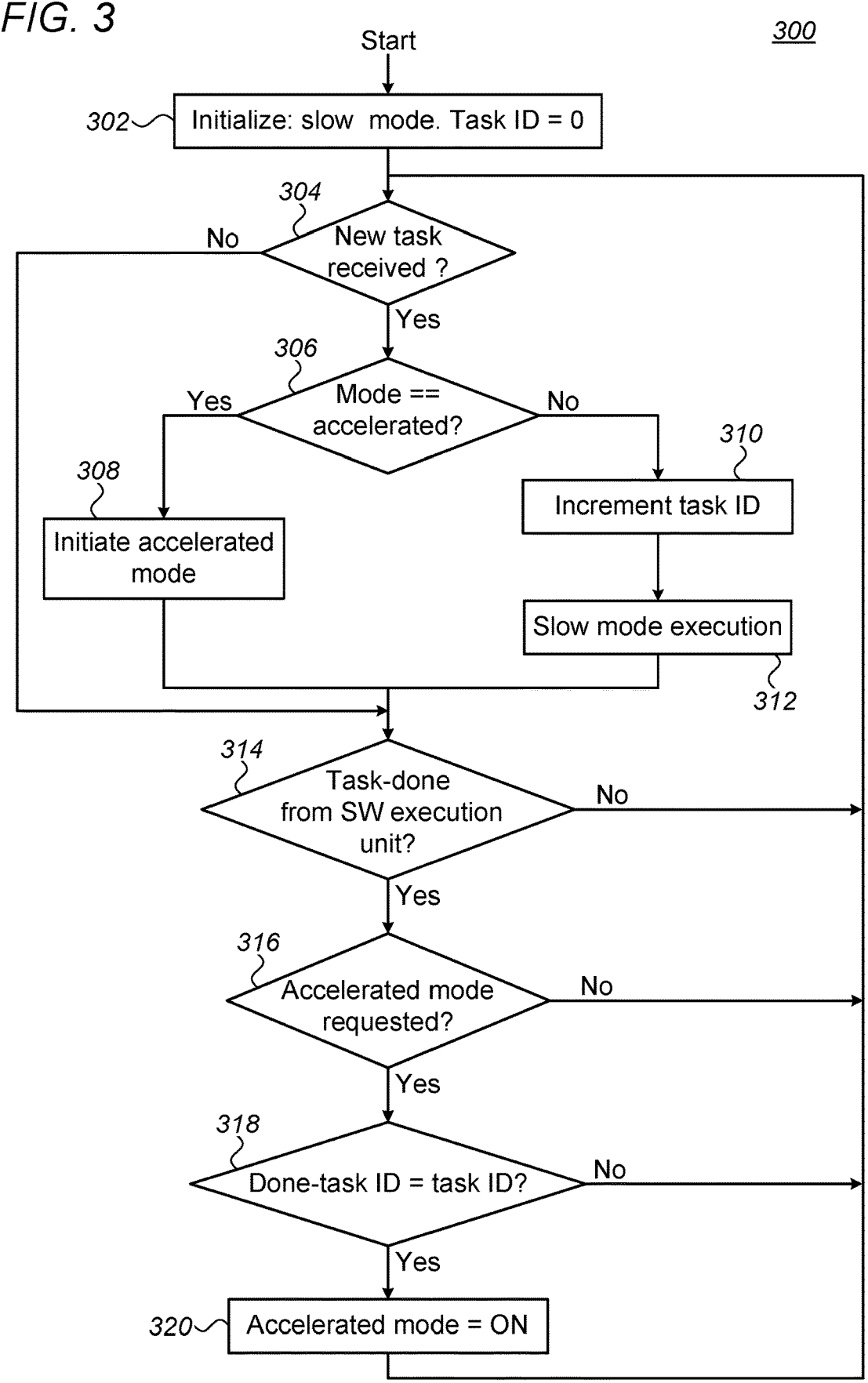
FIG. 3 is a flow chart that schematically illustrates a method for out-of-order avoidance, in accordance with an embodiment of the present invention.

FIG. 3 is a flow chart 300 that schematically illustrates a method for out-of-order avoidance computer system, in accordance with an embodiment of the present invention. The flow is executed by Control Unit 206 (FIG. 2).

The flow chart starts at an Initialize step 302, wherein an Accelerated Mode indicator (for example, Mode Indicator 212 of FIG. 2) is set to indicated slow execution mode, and wherein the Task-ID (for example, the ID generated by ID Generator 208 of FIG. 2) is set to an initial value (a value of 0 in the example embodiment of FIG. 3).

Next, in a Checking for New Task step 304, the Control Unit will wait until it receives a new task and will then go to a Checking Accelerated Mode step 306. After step 306, the Control Unit will go to an Initiating Accelerated Execution step 308 if the Mode Indicator is in Accelerated Mode, and to an Incrementing Task ID step 310 if the Mode Indicator is in Slow Execution Mode.

In Incrementing Task ID step 310, the Control Unit generates a next unique task ID, and then moves to a Slow-Mode-Execution step 312.

According to embodiments of the present invention, when the Control Unit is in step 308, Accelerator 204 (FIG. 2) executes the tasks that the computer system receives for the current flow, whereas when the Control Unit is in step 312, SW Execution Unit 202 (FIG. 2) executes the tasks. After either step 308 or 312, the Control Unit goes to a Checking Slow-Task Done step 314, wherein the Control Unit checks if the SW Execution Unit completed the execution of a task. If, in step 314, the SW Execution Unit has not completed the execution of a task, the Control Unit goes back to step 304, whereas if the SW Execution Unit has completed the execution of a task, the Control Unit goes to a Checking-Accelerated-Mode-Request step 316.

If, in step 316, the Control Unit has not received an accelerated-mode request (e.g. from SW execution Unit 202 of FIG. 2), the Control Unit will return to step 304 and wait for a new task, whereas if the Control Unit has received an accelerated-mode request, the Control Unit will enter a Comparing ID step 318.

In Comparing ID step 318, the Control Unit compares the ID of the last task with the ID of the task that the Slow Execution Unit has completed. If the ID of the last task equals to the ID of the task that the Slow Execution Unit has completed, the Control Unit next goes to a Setting Accelerated Mode step 320, whereas if the ID codes are not equal, the Control Unit will go to step 304. After step 320, the Control Unit goes back to step 304.

Thus, in the example embodiment of FIG. 3, Accelerated Execution mode will only be set if the ID of a task (i.e. the ID given to the last task) is equal to the ID of a task that finishes slow-mode execution, and out-of-order execution of tasks will be avoided.

Figure 4:
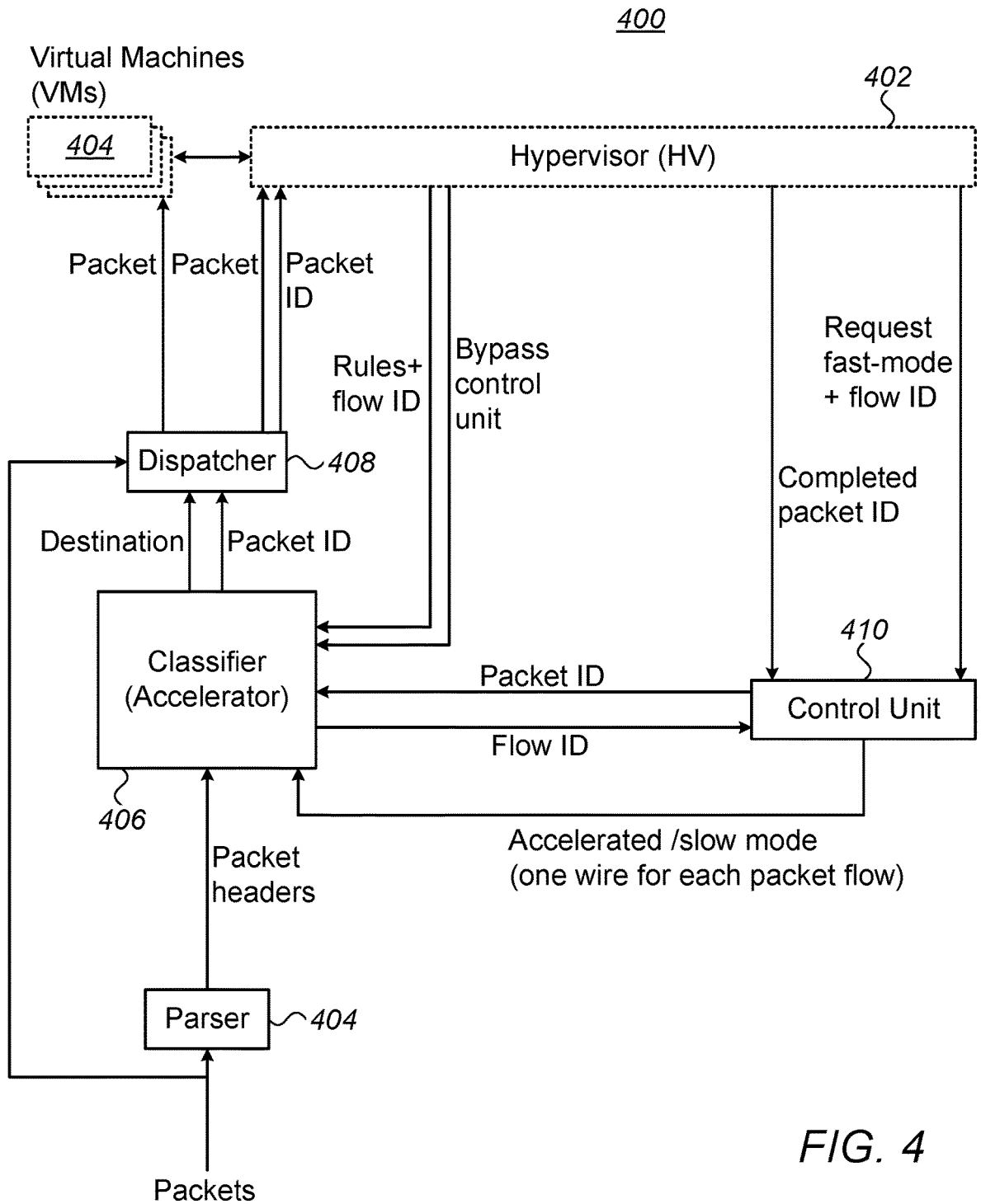
FIG. 4 is a block diagram that schematically illustrates the structure of an out-of-order avoidance computer system, in accordance with another embodiment of the present invention.

FIG. 4 is a block diagram that schematically illustrates the structure of an OoO-A computer system, in accordance with another embodiment of the present invention. In the example embodiment of FIG. 4, computer system 400 comprises a network processor, and task processing comprises classification of packet headers. Acceleration of task execution comprises classification of packets by hardware.

Computer system 400 comprises two software entities—a Hypervisor 402, configured to classify packet headers (i.e. to process tasks) in slow mode, and to generate acceleration rules; and Virtual Machines (VMs) 404. In the example embodiment of FIG. 4, the VMs execute further processing of the packets, and a separate VM is assigned to every flow of packets.

Computer system 400 further comprises the following hardware units: A Parser 404, configured to extract the packet headers from the packets; a Classifier 406, configured to classify packet headers into flows of packets; Dispatcher 408, configured to dispatch either packets with classified headers, for further processing in one of the VMs, or the input packets, for slow mode classification by Hypervisor 402; and, a Control Unit 410, configured to generate unique ID for each of the packets, and to set Accelerated Mode signals (one signal for each flow of packets).

Packets that Computer system 400 receives are input to the Parser, which extracts the packet headers and sends them to Classifier 406. Classifier 406 is configured to accelerate the classification of one or more flows of packets. Hypervisor 402 generates the rules, adds a Flow ID for the flow that the rules apply to, and sends the rules and the Flow ID to the Classifier.

Classifier 406 comprises the accelerated execution unit. If a rule exists for a Flow of Packets, and if Accelerated Mode is On, the classifier will forward the packet header to dispatcher 408, with an indication to which VM 404 the packet should be sent (i.e. execute the task in accelerated mode). If a rule does not exist, the classifier will forward the packet header to dispatcher 408 with an indication that the packet is to be processed in slow mode, by the Hypervisor. If a rule does exist but Accelerated Execution Mode is Off (for the current Flow of packets), the classifier will forward the packet header to Dispatcher 408 with an indication that the packet is to be processed in slow mode, and with the ID that the Control Unit has assigned to the packet.

According to embodiments of the present invention, Dispatcher 408 dispatches packets to be processed, either to one of VMs 404 or to Hypervisor 402. If the packet is processed in accelerated mode (by the classifier), the destination input of the Dispatcher will designate the VM to which the packet will be sent. If the packet must be processed in Slow Mode, the dispatcher will dispatch the packet to be processed by the Hypervisor; with the packet the dispatcher will also send the packet ID (if known).

Control Unit 410 generates unique IDs (for example, sequential numbers, or pseudo random numbers) for the packets of each flow of packets (in some embodiments packets of separate packet-flows may get the same ID). Control Unit 410 also sets Accelerated Mode indicators (one indicator for each flow of packets). Control Unit 410 controls a set of Accelerated/Slow Mode indicators. In the example embodiment of FIG. 4 there is one indicator for each flow of packets (In other embodiments the number of indicator may be smaller, as groups of flows may share the same Accelerated/Slow Mode Indicator).

When a flow of packets starts, Hypervisor 402 initializes the corresponding Accelerated/Slow Mode indicator of Control Unit 410 to indicate Slow mode. After the Hypervisor requests accelerated mode for a flow of packets, the Control Unit will compare the ID of the last packet to the ID of the last slow-mode packet that the Hypervisor has completed. If the two IDs are equal, the Control Unit will set the Accelerated/Slow Mode indicator to Accelerated Mode, allowing Accelerated execution for all further packets of the corresponding flow. The classifier will check the mode indicator of the control unit for every packet. If the mode indicator indicates accelerated mode, the classifier will output the packet with a specific VM in the destination output, whereas if mode indicator indicates slow mode, the classifier will output the packet with an indication that it should be processed by the hypervisor.

Hypervisor 402 also drives a Bypass-Flow-Monitor output. According to embodiments of the present invention, classifier 406 is configured to ignore the Accelerated/Slow mode indicator of Control Unit 410 when Bypass-Flow-Monitor is set, and to use accelerated mode for flows of packets from the time that the classifier receives a rule for the corresponding flow. According to an embodiment, Bypass-Flow-Monitor output will be set if the computer system is in an OoO-A Off mode.

Figure 5:
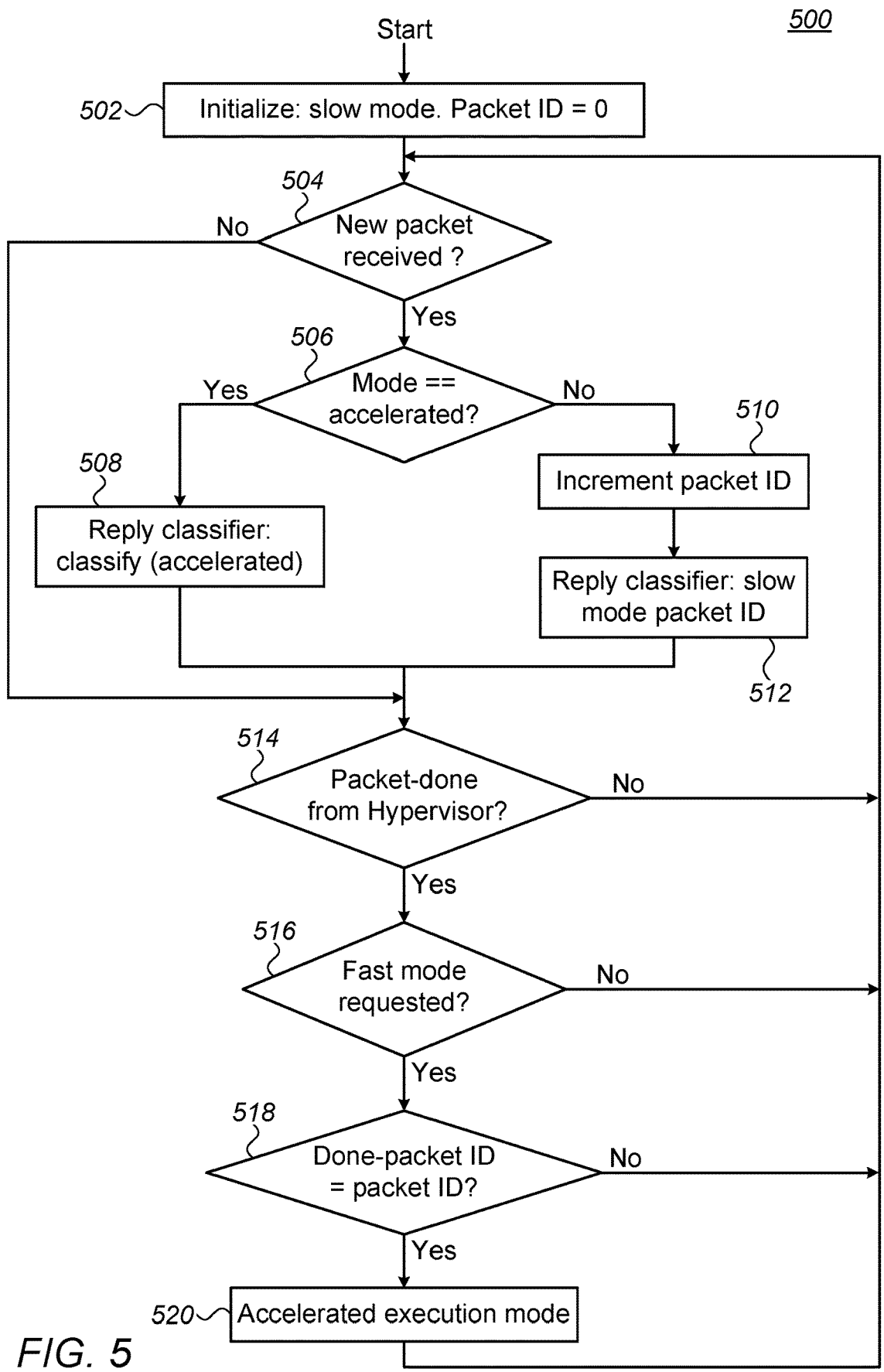
FIG. 5 is a flow chart that schematically illustrates a method for out-of-order avoidance, in accordance with another embodiment of the present invention.

FIG. 5 is a flow chart 500 that schematically illustrates a method for OoO-A, in accordance with another embodiment of the present invention. The flow is executed by Control Unit 410 (FIG. 4). According to some embodiments, multiple copies of flow chart 500 may execute concurrently, for different flows of packets (although FIG. 5 describes one copy only).

The flow chart starts at an Initialize step 502, wherein an Accelerated Mode indicator (which, in the example embodiment of FIG. 4, is part of Control Unit 410) is set to indicate slow execution mode, and wherein the packet-ID (for example, the packet ID generated by Control Unit 420 of FIG. 4) is set to an initial value (for example, 0).

Next, in a Checking-for-New-Packet step 504, the Control Unit will wait until it receives a new task and will then go to a Checking Accelerated Mode step 506. After step 506, the Control Unit will go to a Replying-Classifier-Fast step 508 if the Mode Indicator is in Accelerated Mode, and to an Incrementing-Packet-ID step 510 if the Mode Indicator is in Slow Mode.

In Incrementing-Packet-ID step 510, the Control Unit generates a next unique packet ID, and then moves to a Replying-Classifier-Slow step 512.

According to embodiments of the present invention, when the Control Unit is in step 508, Classifier 406 (FIG. 4) classifies the packets that the computer system receives for the current flow, whereas when the Control Unit is in step 512, the classifier will send the packet and the packet ID, through dispatcher 408, to be executed in Slow Mode by Hypervisor 402.

After either step 508 or 512, the Control Unit goes to a Checking-Packet-Slow-Mode-Done step 514, wherein the Control Unit checks if the Hypervisor has completed the execution of a packet. If, in step 514, the Hypervisor has not completed the execution of a packet, the Control Unit goes back to step 504, whereas if the Hypervisor has completed the execution of a packet, the Control Unit goes to a Checking-Fast-Mode-Request step 516.

In step 516, if the Hypervisor has requested fast-mode, the Control Unit will proceed to a Comparing-ID step 518; whereas if the Hypervisor has not requested fast-mode, the Flow-Monitor will go back to step 504 and wait for a new packet.

In Comparing ID step 518, the Control Unit compares the ID of the last packet with the ID of the packet that the Hypervisor completed. If the ID of the last packet equals to the ID of the packet that the Hypervisor has completed, the Control Unit next goes to a Setting Accelerated Mode step 520; whereas if the ID codes are not equal, the Control Unit will go to step 504. After step 520, the Control Unit goes back to step 504.

Thus, in the example embodiment of FIG. 5, accelerated mode execution by the Classifier will only be set if the ID of the last packet is equal to the ID of a packet that has finished slow-mode execution (by the Hypervisor), and OoO execution of tasks will be avoided.

Additional Example Modes of Operation

Embodiments of the present invention may further comprise one or more of the operating modes described hereinbelow:

1. Timer Mode. The CPUs may set a timer, and force Accelerated-Mode when the timer expires. This mode may be useful in case a sequence of successive accelerated-mode requests fails and the benefit of in-order execution is cancelled by the continuous slow-path handling.
2. Use first-slow-task ID=0. As the first task of a flow does not get an ID from the Flow-Monitor, an ID=0 will be used. When in this mode, the Flow-Monitor will not assign the value of 0 to tasks (for example, it may start with ID=1). This mode will allow an earlier setting of accelerated-mode, as the ID comparison could start from the second packet.
3. Reduced-Accelerated-Mode-Requests. Accelerated-Mode request may cost in hardware resources, as additional flows must be monitored in this mode the Hypervisor is aware of tasks which are still in process by slow-path and avoids issuing accelerated-mode requests.

The configurations of computer systems 200 (FIGS. 2) and 400 (FIG. 4) are example configurations that are shown purely for the sake of conceptual clarity. Any other suitable configurations can be used in alternative embodiments. For example, FIG. 4 shows four hardware units—Parser 404, Classifier 406, Dispatcher 408 and Control Unit 410; Any or all of them could be implemented by software, or by combination of hardware and software. FIG. 4 further describes a software Hypervisor and software virtual machines; any or all of them may be implemented by hardware, or by a combination of hardware and software. Moreover, embodiments of the present invention do not necessarily assume virtual machine implementation—any other suitable operating system may be used.

Any of the elements described in FIG. 2 and FIG. 3 may be implemented using suitable hardware, such as in an Application-Specific Integrated Circuit (ASIC) or Field-Programmable Gate Array (FPGA), using software, using hardware, or using a combination of hardware and software elements.

CPUs 202 of FIG. 2, and the CPUs on which the software of FIG. 4 executes may comprise a general-purpose programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A computer system, comprising:
one or more processors, which are configured to run software that executes tasks in a normal mode;
one or more hardware accelerators, which are configured to execute the tasks in an accelerated mode; and
control circuitry, which is configured to:
receive one or more flows of the tasks for execution by the processors and the accelerators;
assign one or more initial tasks of each flow for execution by the processors, and assign subsequent tasks of each flow for execution by the accelerators; and
verify, for each flow, that the accelerators do not execute the subsequent tasks of the flow until the processors have fully executed the initial tasks of the flow.

2. The computer system according to claim 1, wherein the control circuitry is configured to assign ID codes to the tasks, and to verify, for each flow, that the accelerators do not execute the subsequent tasks until the processors have fully executed the initial tasks, by comparing a most-recently assigned task ID to the IDs of one or more of the tasks executed in the Normal Mode.

3. The computer system according to claim 1, wherein the tasks comprise classification tasks of packet headers.

4. The computer system according to claim 1, wherein the processors are configured to generate and send to the accelerators a rule upon executing the initial tasks of a given flow, and wherein the accelerators are configured to execute the subsequent tasks of the given flow in accordance with the rule.

5. A Method, comprising:
in a computer system having one or more processors that execute tasks in normal mode, one or more hardware accelerators that execute tasks in accelerated mode, and control circuity, receiving one or more flows of the tasks for execution by the processors and the accelerators;
assigning one or more initial tasks of each flow for execution by the processors, and assigning subsequent tasks of each flow for execution by the accelerators; and
verifying, for each flow, that the accelerators do not execute the subsequent tasks of the flow until the processors have fully executed the initial tasks of the flow.

6. The method according to claim 5, wherein verifying that the accelerators do not execute the subsequent tasks until the processors have fully executed the initial tasks comprises assigning ID codes to the tasks, and, for each flow, comparing a most-recently assigned task ID to the IDs of one or more of the tasks executed in the Normal Mode.

7. The method according to claim 5, wherein executing tasks comprises executing packet header classification tasks.

8. The method according to claim 5, further comprising generating a rule upon executing the initial tasks of a given flow, and executing of subsequent tasks, by the accelerators, in accordance with the rule.

* * * * *